Patented May 18, 1937

2,080,533

UNITED STATES PATENT OFFICE 2,080,533

PREPARATION OF CELLULOSIC MATERIAL

Martin J. Connolly, New York, N. Y.

No Drawing. Application July 11, 1935, Serial No. 30,947. Renewed September 23, 1936

10 Claims. (Cl. 92—13)

This invention relates to the preparation of cellulosic material and more particularly to the production of purified cellulose of a high alpha content from hemp residues.

It has been suggested heretofore to utilize hemp, among other things, as a raw material for the production of purified cellulose. The suggestions proposed heretofore, however, comprised essentially the substitution of hemp as a raw material in lieu of other cellulosic starting materials, such as spruce and other woods. In other words, the prior suggestions have comprised either the utilization of the sulphite or the soda process for the digestion of hemp.

I have found that hemp provides an excellent starting material for the preparation of alpha cellulose or relatively pure cellulose. I have further found that the typical digestion methods, such as the sulphite or alkali treat, are not productive of improved results. Thus, for example, if hemp hurds are treated for a prolonged period of time with caustic, i. e. the soda process, at the usual high temperatures of the order of 170° C. for a prolonged period of time, it is found that this heavy treatment produces a syrupy consistency of the liquid which apparently retards further digestion.

I have found on the other hand that a high alpha cellulose, that is purified cellulose ranging from 85% to 90% or more of alpha, may be produced from hemp, and particularly from hemp hurds, by utilizing a mild intermittent digestion treatment in sharp distinction to the prior methods of the substantially continuous and drastic treatment. While proposing no definite rationale of the process, it would appear that such a treatment is peculiarly suitable to cellulose starting material having the characteristics of hemp hurds. Such hurds, as a general rule, run very high in pentosans, usually of the order of about 26% and approximately 5 or 6% xylan. The hurds are relatively low in lignin. The term "pentosan" is used in its usual connotation as a conventionalized analytic term rather than one which expresses the actual amount of pentose yielding material in the wood. It appears that xylan in its pure form is relatively soluble in water but in the presence of lignin the xylan is not readily dissolved in water, due undoubtedly to either some chemical combination between the lignin and the xylan or to the protective action of one on the other. As noted above, I have found that when a material having the characteristics of hemp hurds is subjected to a intermittent treatment of a mild character, combined with alternating washings, a high alpha cellulose is obtained with minimal losses. As will be appreciated more fully hereinafter, the utilization of the dilute reagents insures a relatively low cost of treatment and the economies thus derived accentuated, thus resulting in a high yield of alpha cellulose.

An object of the present invention therefore is to produce alpha cellulose from hemp hurds.

Another object of the invention is to provide a novel manner of treating wood or cellulosic material having a relatively high percentage of pentosans.

A further object is to provide a novel method of producing alpha cellulose from cellulosic materials having the characteristics of hemp, and more particularly hemp hurds.

With these and other equally important objects in view the invention comprises the concept of subjecting the starting material to a series of relatively mild digestion treatments, such treatments being alternated with washing or other clarification so as to obtain sequential preferential extraction of the undesired constituents of the starting material.

In order to more fully explain the invention a preferred method will be described but it will be understood that this is given primarily for the purpose of exemplifying the underlying principles rather than defining the exclusive method by which the novel concept may be effectuated.

In carrying out the process the hemp as harvested is retted by any suitable method. If desired the material may be subjected to a chemical retting, that is to say soaked or saturated in a solution of a degumming agent whereby the longer fibers are more readily removed. Preferably the material is subjected to a mechanical retting, as by passage through an impact beater or under crushing rolls. In any event the long fibrous external coating of the plant is removed and the residue, or hemp hurds, are then subjected to a series of chemical treatments. Preferably the hurds are first ground to a relatively uniform desired size. In order to secure the maximum recovery of the available longer fibers, after such grinding the material may be air classified to remove such fibers before the chemical digestion of the residue or hurds.

The hurds, however produced, are then subjected to a mild alkali treatment. This comprises soaking the hurds, preferably in an open tub, in a mild caustic solution. This solution preferably comprises a 1% sodium hydroxide solution, although in lieu of the caustic, ammonium hydroxide, ammonium carbonate or any other usual alkalies may be employed. Preferably to the solution is added about one-tenth of 1% of sodium sulphite. The hurds are given the preliminary soak in the above defined solution for a period of from one to three hours while maintained at a temperature of 70° F. This preliminary treatment serves to extract certain of the undesired constituents of the hurds and furthermore thoroughly wets and compacts the hurds, thus checking the tendency of the fibers to fluff up or expand in the digester during the subsequent digestion treatment. During this treatment the solution may be recirculated to and from the tub so as to insure a uniform concentration of the reagent and to maintain uniform thermal conditions. Such recirculation, however, is not essential.

After the preliminary treatment the solution is drained off and the mass then washed with water. This may readily be done by providing a suitable screen in the drawoff line or drain of the soaking tub. The washing is conducted under such circumstances as to substantially completely remove the reagent and its solubilized constituents.

The preliminarily treated and washed fibers are then deposited in a digester in which they are treated with the dilute caustic solution. Preferably this comprises an aqueous solution of from 1% down to one-tenth of 1% sodium hydroxide. This treatment is carried out in a closed digester at a temperature of the order of 130° C. and at a gauge pressure of twenty-five pounds or higher. This mild digestion treatment is continued from three to seven hours.

It will be understood that during this treatment the liquor may be recirculated to and from the digester to insure uniform permeation of the fibers with the reagent and to maintain substantially uniform thermal conditions in the digester.

At the end of this treatment the reagent is then drained to a suitable storage vessel and the digested fiber washed to remove the reagent. This washing may be done within the digester itself or the fibers may be discharged, through a suitable blow-off line, into a washing pit. In the preferred mode of operation the fibers are discharged from the digester into a washing vessel in which they are washed with water while maintained in agitation. After washing the material is filtered, and preferably again washed and filtered. The partially digested and washed fibers are then subjected to a mild bleaching action, although this intermediate bleach may in some circumstances be dispensed with.

The fibers are then deposited in a suitable vessel and are soaked for a period of from one to four hours in a cold strong caustic solution. This solution comprises approximately a 17% sodium hydroxide solution. After such cold soak the mass is drained, then washed and bleached with sodium hypochloride or any other suitable bleaching agent.

The product produced as a result of this treatment was purified cellulose of a high alpha content and of improved color.

Within the broad concept herein expressed other and specifically different methods may be employed. Thus in lieu of subjecting the hurds to alternate digestion and washing, using only alkaline reagents, such intermittent digestion and washing may be employed using acid reagents together with alkaline reagents. In another preferred method, therefore, the hurds may be fed to a digester and contacted therein with a dilute solution, of the order of from 1 to 5%, of nitric acid preferably containing a small percentage, of the order of .1%, sodium phenate or other equivalent phenol salt. This acid digestion may be carried out for from one to four hours or more at moderately high temperatures of the order of 60 to 90° F.

After this acid digestion the acid is drained off and the mass washed with water. The preliminarily digested hurds are then subjected to a digestion treatment with a mild caustic solution, such as the one described, namely one containing 1% of sodium hydroxide or its equivalent and .1% of sodium sulphite. After treatment in the alkaline reagent for a period of from one to three or more hours at a temperature of the order of 70° C., the alkaline reagent is drained off and the mass washed with water. The purified hurds may then be bleached with any suitable reagent, or when a high alpha content is desired may be subjected to the described treatment in strong cold caustic.

It was found as a result of this treatment that a very high yield of alpha cellulose is secured, based on the weight of the original charge, and that such yield is considerably higher than is secured by a continuous treatment in any given digestion reagent. This large difference is believed due to the fact that the intermittent mild treatments selectively remove certain of the undesired constituents, such as pentosans and lignin, thus conserving to a great degree the cellulose values as well as insuring minimal amounts of the reagents. These savings are found to more than compensate for the protracted time involved in the intermittent digestions and washings.

While a preferred modification of the invention has been disclosed, it is to be understood that this is given largely by way of example to illustrate the fundamental principles involved, which is conceived to reside in the concept of the intermittent mild treatment and/or the alternate washing of the stock.

I claim:

1. A process of producing cellulosic material which comprises retting hemp, separating the hurds from the longer fibers, then subjecting the hemp hurds to intermittent digestion with alkaline reagents.

2. A process of producing purified cellulosic material which comprises subjecting hemp hurds to the action of a dilute alkaline solution at relatively low temperatures, separating the hurds from the solution and then subjecting the hurds to digestion in an alkaline liquor at elevated temperatures and pressures.

3. A process of producing purified cellulosic material which comprises soaking hemp hurds in a dilute alkaline solution at relatively low temperature, withdrawing the solution and washing the hurds with water and then digesting the hurds in a dilute alkaline solution at elevated temperatures and pressures.

4. A process of producing purified cellulosic material which comprises subjecting hemp hurds to alternating digestion and washing steps, the digestion being carried out with dilute alkaline liquors.

5. A process of producing purified cellulosic material which comprises subjecting hemp hurds to alternate digestion and washing steps, the digestion steps being effected with dilute reagents.

6. A process of producing cellulosic material which comprises retting hemp, separating the hemp hurds from the longer fiber, and subjecting the hurds to intermittent digestion with relatively dilute acid and alkaline reagents.

7. A process of producing cellulosic material which comprises subjecting hemp hurds to the action of a dilute acid digestion liquor, separating the hurds from the solution and then subjecting the hurds to digestion in an alkaline medium at elevated temperatures and pressures.

8. A process of producing cellulosic material which comprises subjecting hemp hurds to the action of a dilute acid digestion agent, removing the digestion agent and washing the hurds, then subjecting the hurds to the action of a dilute alkaline digestion agent and washing and bleaching the hurds.

9. The process of producing cellulosic material which comprises retting hemp, separating the hurds from the longer fibers, then subjecting the hemp hurds to intermittent digestion with alkaline and acid reagents.

10. The process of producing cellulosic material which comprises separating hemp hurds from the longer fibers, subjecting the hurds to the action of a dilute caustic solution, washing the thus treated hurds and subsequently subjecting the preliminarily treated hurds to further digestion with a dilute caustic solution.

MARTIN J. CONNOLLY.